(12) United States Patent
Shimizu

(10) Patent No.: US 12,514,458 B2
(45) Date of Patent: Jan. 6, 2026

(54) DEVICE, METHOD, AND PROGRAM FOR INFERRING BLOOD PRESSURE INFORMATION

(71) Applicant: CITIZEN WATCH CO., LTD., Tokyo (JP)

(72) Inventor: Hideki Shimizu, Tokyo (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 121 days.

(21) Appl. No.: 18/550,963

(22) PCT Filed: Mar. 18, 2022

(86) PCT No.: PCT/JP2022/012869
§ 371 (c)(1),
(2) Date: Sep. 16, 2023

(87) PCT Pub. No.: WO2022/196820
PCT Pub. Date: Sep. 22, 2022

(65) Prior Publication Data
US 2024/0138686 A1   May 2, 2024

(30) Foreign Application Priority Data
Mar. 19, 2021   (JP) ................................. 2021-046020

(51) Int. Cl.
*A61B 5/021*   (2006.01)
*A61B 5/00*    (2006.01)

(52) U.S. Cl.
CPC ........ *A61B 5/02108* (2013.01); *A61B 5/7246* (2013.01); *A61B 5/7264* (2013.01)

(58) Field of Classification Search
CPC . A61B 5/02108; A61B 5/7246; A61B 5/7264; A61B 5/0077; A61B 5/021; A61B 5/02125; A61B 5/02
See application file for complete search history.

(56) References Cited

U.S. PATENT DOCUMENTS 8,838,209 B2 * 9/2014 Mestha ................ A61B 5/0075
600/407
9,355,301 B2 * 5/2016 Karakotsios ......... G06V 40/193
(Continued)

FOREIGN PATENT DOCUMENTS

JP   2011-212043 A   10/2011
JP   2015-54223 A     3/2015
(Continued)

OTHER PUBLICATIONS

WIPO, International Search Report for International Application No. PCT/JP2022/012869, May 31, 2022.
(Continued)

*Primary Examiner* — Bo Joseph Peng
(74) *Attorney, Agent, or Firm* — IMAIZUMI IP LAW, PLLC; Toshikatsu Imaizumi

(57) ABSTRACT

An object of the present invention is to provide a device for inferring blood pressure information that can infer blood pressure information conveniently. A device for inferring blood pressure information according to an embodiment of the present disclosure includes a moving-image acquisition unit configured to acquire moving images of a predetermined part of a living body captured at a first frame rate to detect a delay time between pulse waves in a first region and a second region separated by a predetermined distance in the predetermined part; a moving-image reproduction unit configured to reproduce the acquired moving images at a second frame rate lower than the first frame rate; a pulse wave extraction unit configured to extract a first pulse wave in the first region and a second pulse wave in the second region, based on the reproduced moving images; a pulse wave velocity calculation unit configured to calculate a pulse wave velocity from the predetermined distance and a time difference between peaks of the first pulse wave and the second pulse wave; a blood pressure information inference
(Continued)

unit configured to infer blood pressure information, based on the calculated pulse wave velocity; and an output unit configured to output the inferred blood pressure information.

12 Claims, 11 Drawing Sheets

(56) References Cited

U.S. PATENT DOCUMENTS

| | | | |
|---|---|---|---|
| 2011/0245651 A1 | 10/2011 | Nakamura | |
| 2014/0376789 A1* | 12/2014 | Xu | G06T 7/0016 |
| | | | 382/128 |
| 2015/0366456 A1* | 12/2015 | Takamori | A61B 5/0077 |
| | | | 600/479 |
| 2016/0228011 A1* | 8/2016 | Tsubaki | A61B 5/7203 |
| 2016/0317041 A1* | 11/2016 | Porges | A61B 5/7235 |
| 2018/0199893 A1* | 7/2018 | Hübner | G16H 50/20 |
| 2018/0310845 A1 | 11/2018 | Hamada et al. | |
| 2019/0000415 A1* | 1/2019 | Anand | G01S 7/52066 |
| 2021/0038097 A1 | 2/2021 | Hamada et al. | |

FOREIGN PATENT DOCUMENTS

| | | |
|---|---|---|
| JP | 2017-85422 A | 5/2017 |
| JP | 2017-131413 A | 8/2017 |
| WO | 2014-136310 A1 | 9/2014 |
| WO | 2015/045554 A1 | 4/2015 |

OTHER PUBLICATIONS

WIPO, International Preliminary Report on Patentability including Written Opinion for International Application No. PCT/JP2022/012869, May 31, 2022.

* cited by examiner

DEVICE, METHOD, AND PROGRAM FOR INFERRING BLOOD PRESSURE INFORMATION

FIELD

The present invention relates to a device, a method, and a program for inferring blood pressure information.

BACKGROUND

Cuff-type sphygmomanometers, which include a cuff to be wound around an upper arm, are widely used as a means for measuring the blood pressure of a human. However, having a subject wind a cuff around an upper arm is not preferable in terms of ease in checking blood pressure. In view of this, a "cuffless" sphygmomanometer that can measure blood pressure conveniently has been reported.

A known method for estimating blood pressure without a cuff (e.g., Patent Literature 1) includes detecting pulse waves from images of different parts of a human body, calculating a pulse wave velocity based on a time difference between the pulse waves, and estimating blood pressure from the pulse wave velocity. In the method described in Patent Literature 1, blood pressure is estimated from a time difference of approximately 100 milliseconds, using a part longer than a predetermined length, such as a face or a hand, so that the time difference in propagation of pulse waves may be easily identified.

CITATION LIST

Patent Literature

[Patent Literature 1] International Publication No. 2014/136310

SUMMARY

Unfortunately, in a conventional method for measurement with video of a face, it may be difficult to acquire an accurate waveform of pulse waves, for example, because makeup may cause failure to read information on color of the skin surface accurately, or the exposed area of the skin surface may be limited by a mask covering a face.

An object of an invention according to an embodiment of the present disclosure is to provide a device for inferring blood pressure information that can infer blood pressure information conveniently.

A device for inferring blood pressure information according to an embodiment of the present disclosure includes a moving-image acquisition unit configured to acquire moving images of a predetermined part of a living body captured at a first frame rate to detect a delay time between pulse waves in a first region and a second region separated by a predetermined distance in the predetermined part, a moving-image reproduction unit configured to reproduce the acquired moving images at a second frame rate lower than the first frame rate, a pulse wave extraction unit configured to extract a first pulse wave in the first region and a second pulse wave in the second region, based on the reproduced moving images, a pulse wave velocity calculation unit configured to calculate a pulse wave velocity from the predetermined distance and a time difference between peaks of the first pulse wave and the second pulse wave, a blood pressure information inference unit configured to infer blood pressure information, based on the calculated pulse wave velocity, and an output unit configured to output the inferred blood pressure information.

The device according to an embodiment of the present disclosure preferably further includes a moving-image conversion unit configured to convert the acquired moving images to moving images in an uncompressed format.

The device according to an embodiment of the present disclosure preferably further includes a filter control unit configured to control the band of a square-wave correlation filter for extracting the first pulse wave and the second pulse wave from the acquired moving images.

The device according to an embodiment of the present disclosure preferably further includes an image recognition unit configured to recognize an image of the predetermined part out of moving images at the second frame rate acquired by the moving-image acquisition unit, before the moving-image acquisition unit acquires the moving images captured at the first frame rate.

In the device according to an embodiment of the present disclosure, the image recognition unit preferably recognizes an image of the predetermined part out of the acquired moving images, using a trained image recognition model.

The device according to an embodiment of the present disclosure preferably further includes an image determination unit configured to determine whether pulse waves can be detected from moving images at the second frame rate acquired by the moving-image acquisition unit, before the moving-image acquisition unit acquires the moving images captured at the first frame rate.

In the device according to an embodiment of the present disclosure, the image determination unit preferably warns when pulse waves cannot be detected from the acquired moving images.

In the device according to an embodiment of the present disclosure, the blood pressure information preferably includes information on at least one of blood pressure, vascular age, or an arteriosclerosis level.

In the device according to an embodiment of the present disclosure, the predetermined part is preferably a hand.

The device according to an embodiment of the present disclosure preferably further includes an input unit into which information on gender and a height value of a subject whose blood pressure is measured are inputted, and a predetermined-distance calculation unit configured to calculate the predetermined distance, based on a hand length estimated from the information on gender and the height value.

A method for inferring blood pressure information according to an embodiment of the present disclosure includes acquiring moving images of a predetermined part of a living body captured at a first frame rate to detect a delay time between pulse waves in a first region and a second region separated by a predetermined distance in the predetermined part by a moving-image acquisition unit, reproducing the acquired moving images at a second frame rate lower than the first frame rate by a moving-image reproduction unit, extracting a first pulse wave in the first region and a second pulse wave in the second region, based on the reproduced moving images by a pulse wave extraction unit, calculating a pulse wave velocity from the predetermined distance and a time difference between peaks of the first pulse wave and the second pulse wave by a pulse wave velocity calculation unit, inferring blood pressure information, based on the calculated pulse wave velocity by a blood pressure information inference unit, and outputting the inferred blood pressure information by an output unit.

A program for inferring blood pressure information according to an embodiment of the present disclosure causes a computer to execute a process including the steps of acquiring moving images of a predetermined part of a living body captured at a first frame rate to detect a delay time between pulse waves in a first region and a second region separated by a predetermined distance in the predetermined part, reproducing the acquired moving images at a second frame rate lower than the first frame rate, extracting a first pulse wave in the first region and a second pulse wave in the second region, based on the reproduced moving images, calculating a pulse wave velocity from the predetermined distance and a time difference between peaks of the first pulse wave and the second pulse wave, inferring blood pressure information, based on the calculated pulse wave velocity, and outputting the inferred blood pressure information.

The device for inferring blood pressure information according to an embodiment of the present disclosure can infer blood pressure information conveniently.

DESCRIPTION OF EMBODIMENTS

A device, a method, and a program for inferring blood pressure information according to the present invention will now be described with reference to the attached drawings. However, It should be noted that the technical scope of the present invention is not limited to the embodiments thereof, and covers the invention described in the claims and equivalents thereof.

First Embodiment

Figure 1:
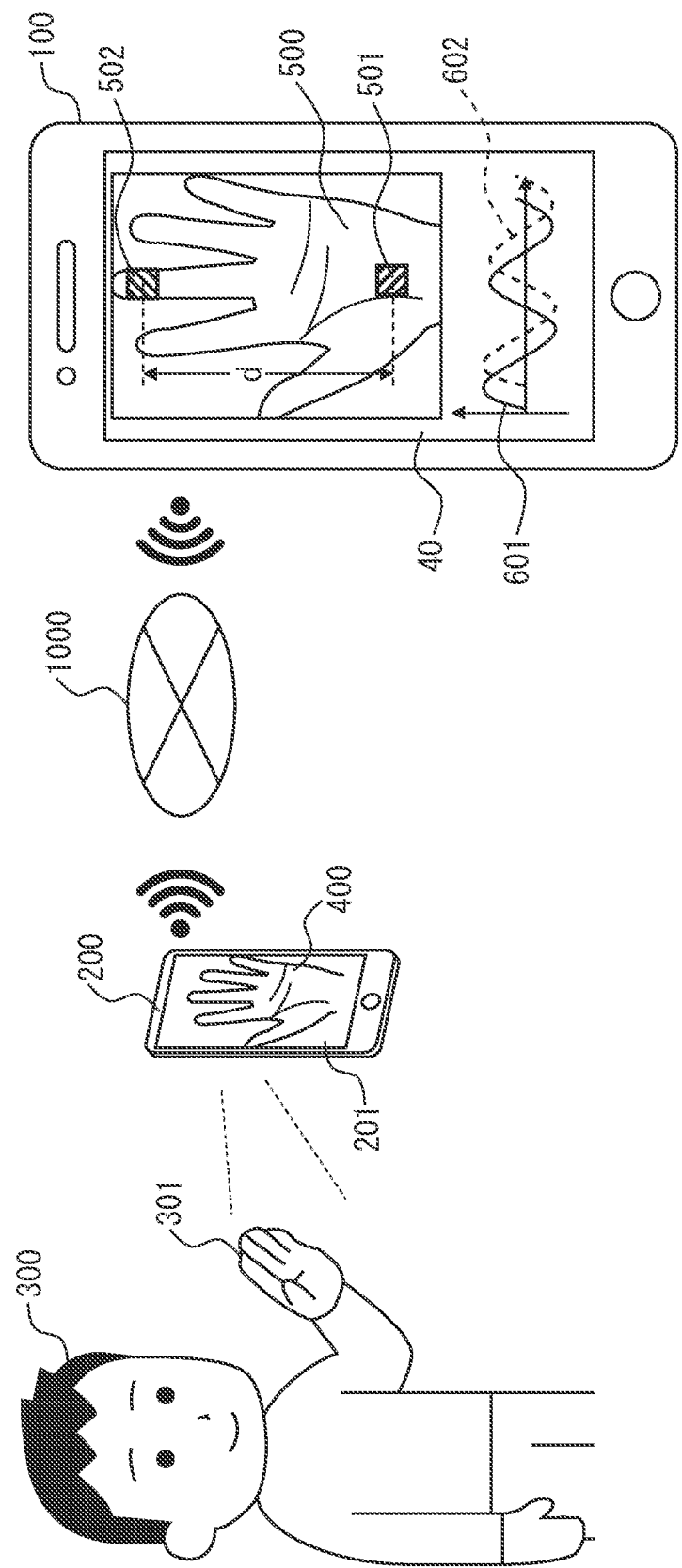
FIG. 1 is a schematic diagram describing measurement with a device for inferring blood pressure information according to a first embodiment of the present disclosure.

First, a device for inferring blood pressure information according to a first embodiment of the present disclosure will be described. FIG. 1 shows a schematic diagram describing measurement with a device for inferring blood pressure information according to a first embodiment of the present disclosure. Regarding a device 100 for inferring blood pressure information according to a first embodiment, the case where blood pressure information, such as blood pressure, is inferred using images of a hand 301 of a subject 300 will be described as an example. The hand 301, whose images can be easily captured using a camera of a mobile device 200, is not affected by makeup which would make it difficult to observe the color of the skin surface or is not covered by a mask, unlike the face of a human. In addition, it is assumed that the color of the palm skin rarely changes, for example, due to sunburn, and thus not difficult to observe. However, the invention is not limited to such an example, and a part other than a hand may be used as a predetermined part to infer blood pressure information, as long as the color of the skin can be easily observed.

In the example shown in FIG. 1, moving images 400 of the hand 301 of the subject 300 are first captured using the mobile device 200. The captured moving images 400 are displayed on a display unit 201 of the mobile device 200. The mobile device 200 transmits data of the captured moving images 400 to the device 100, which is another mobile device, via a communication network 1000. The device 100 infers blood pressure information of the subject 300 from the received moving image data. The "moving images" herein refer to multiple images sequentially reproduced at regular intervals. Thus, a set of still images is also included in the moving images, as long as they are reproduced at regular intervals.

The moving images 400 of the hand 301 of the subject 300 captured with the mobile device 200 are transmitted to the device 100 by wired or wireless communication. FIG. 1 shows an example in which received moving images 500 of the hand are displayed on a display unit 40 of the device 100. However, the invention is not limited to such an example, and the moving images 500 received by the device 100 may be reproduced (processed) without being displayed on the display unit 40. The device 100 reproduces the received moving images 500 of the hand to extract a first pulse wave 601 from time-varying changes in color of the moving images of a first region 501 at the heel of the hand. In addition, the device 100 reproduces the same moving images again to extract a second pulse wave 602 from time-varying changes in color of the moving images of a second region 502 at a fingertip of the hand. The first region 501 and the second region 502 are separated by a predetermined distance d. The predetermined distance d may be the distance between the center positions of the first region 501 and the second region 502. In the example shown in FIG. 1, the first region 501 is at the heel of the hand, whereas the second region 502 is near the first joint of the middle finger. However, the invention is not limited to such an example, and the first region 501 and the second region 502 may be a predetermined part of another finger and a part away from the heel of the palm, respectively, or may be two regions of a part other than a hand.

Out of RGB color signals of the moving images of the first region 501 and the second region 502, the intensity of the green (G) signal changes depending on pulse waves. This is based on the intensity of the G-signal changing depending on the amount of hemoglobin included in blood flowing in arteries.

When the second region 502 is at a fingertip and the first region 501 is at the heel of the hand, the propagated second pulse wave 602 observed at the second region 502 is delayed with respect to the first pulse wave 601 observed at the first region 501 because the second region 502 is farther from the heart than the first region 501. Thus, a pulse wave velocity can be calculated from the delay between the first pulse wave 601 and the second pulse wave 602 and the predetermined distance d between the first region 501 and the second region 502. Pulse wave velocity and blood pressure have a relationship in which a rise in systolic pressure increases tension of vessel walls to decrease the elasticity of blood vessels, thereby increasing pulse wave velocity. The use of this relationship enables inferring blood pressure information based on the pulse wave velocity.

In the example shown in FIG. 1, the device 100 according to the first embodiment receives data of the moving images of the hand 301 of the subject 300 from outside. This eliminates the need for the device 100 to capture moving images of the subject 300 by itself. As a result, the device 100 can infer blood pressure information of the subject 300 by receiving moving-image data of the predetermined part of the subject 300 from the mobile device 200, regardless of where the subject 300 is.

The moving-image data may be transmitted from the mobile device 200 directly to the device 100 without passing through the communication network 1000. The subject 300 may capture moving images of the hand 301 with the mobile device 200 and store them in advance, and the stored moving-image data may be transmitted to the device 100.

Figure 2:
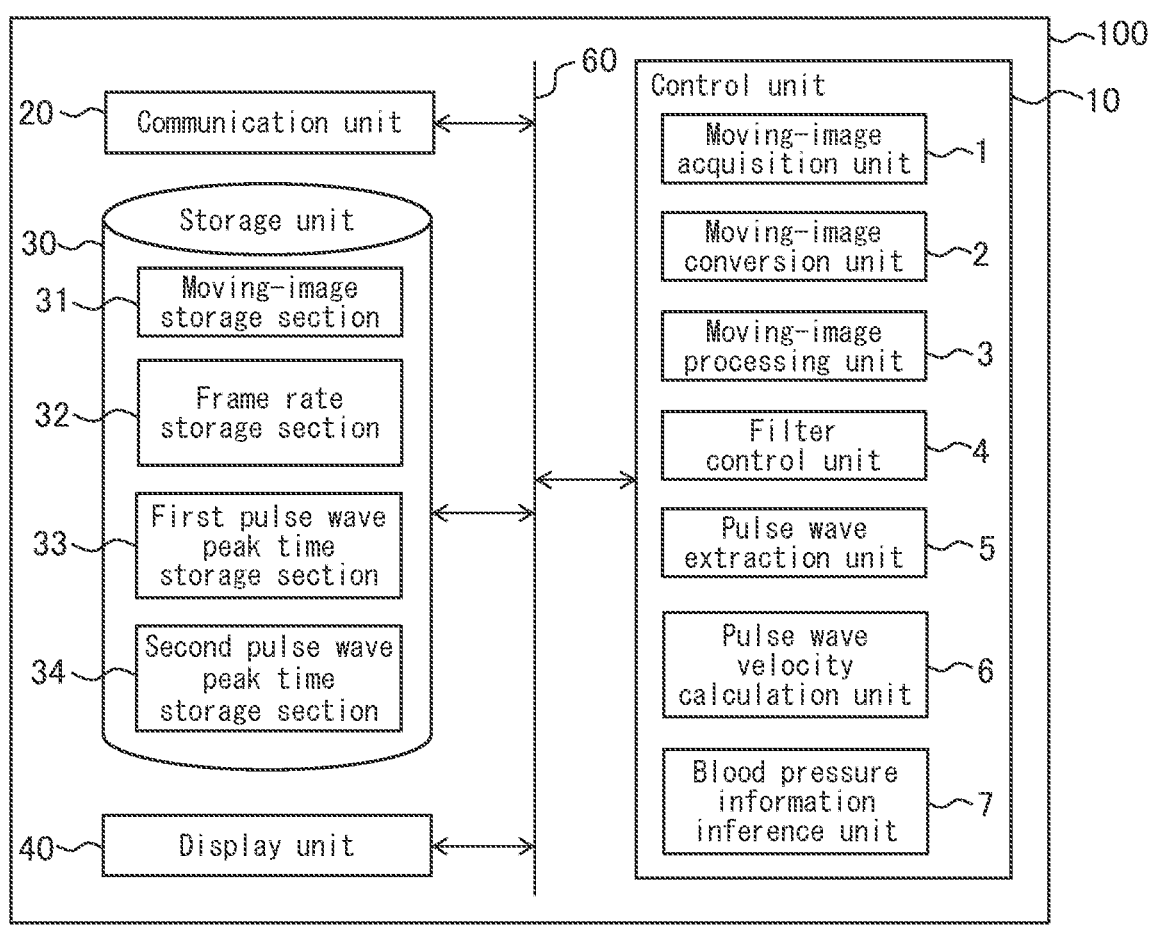
FIG. 2 is a block diagram showing the configuration of the device for inferring blood pressure information according to the first embodiment of the present disclosure.

FIG. 2 is a block diagram showing the configuration of the device 100 according to the first embodiment of the present disclosure. The device 100 includes a controller 10, a communication unit 20, and a storage unit 30, in addition to the display unit 40, which are connected with an inside bus 60. As the device 100 can be used, for example, a mobile device, such as a smartphone or a tablet terminal, or a notebook PC.

The controller 10 includes a moving-image acquisition unit 1, a moving-image conversion unit 2, a moving-image reproduction unit 3, a filter control unit 4, a pulse wave extraction unit 5, a pulse wave velocity calculation unit 6, and a blood pressure information inference unit 7. The elements included in the controller 10 are implemented by a computer in the device 100 including a CPU, a ROM, and a RAM, as software (a program).

The communication unit 20 includes a transmission and reception module for communicating with hardware outside the device 100. The communication unit 20 receives moving-image data of the predetermined part of the subject 300 from outside.

The storage unit 30 is, for example, a semiconductor memory, and includes a moving-image storage section 31, a frame rate storage section 32, a first pulse wave peak time storage section 33, and a second pulse wave peak time storage section 34.

The display unit 40 is an example of the output unit. The display unit 40 is constructed, for example, from a liquid crystal display, and can display acquired moving images of the predetermined part of the subject, detected pulse waves, and inferred blood pressure information. The output unit may include a voice output device, and output the inferred blood pressure information by voice.

The moving-image acquisition unit 1 acquires moving images of a predetermined part of a living body captured at a first frame rate to detect a delay time between pulse waves in the first region 501 and the second region 502 separated by a predetermined distance d in the predetermined part. The first frame rate is higher than a second frame rate at which the moving images are reproduced. For example, when the second frame rate is 30 frames per second (FPS), the first frame rate may be 240 FPS. However, the invention is not limited to such an example, and other frame rates may be used as the first and second frame rates.

In a second embodiment described below, the moving-image acquisition unit 1 can also acquire moving images captured at the second frame rate.

The positions of the first region 501 and the second region 502 may be prestored in the storage unit 30. For example, the storage unit 30 may store the position coordinates of the bottom of a palm on the wrist side and the top of a fingertip as those of measurement frames of the first region 501 and the second region 502.

The moving-image storage section 31 stores moving images of the predetermined part of a living body captured at the first frame rate. For example, the first frame rate may be 240 FPS. This value of the first frame rate can be stored in the frame rate storage section 32, and the moving-image acquisition unit 1 can determine whether moving images acquired from the communication unit 20 are captured at the first frame rate, by referring to the frame rate storage section 32.

The moving-image conversion unit 2 converts the acquired moving images to moving images in an uncompressed format. The uncompressed format may be, for example, Base64 format. However, the invention is not limited to such an example, and moving images may be converted to another uncompressed format. When the acquired moving images are in MP4 format, missing frames may occur during playback because of compression of the moving-image data, which may result in distortion of a waveform. Thus the moving images captured at the first frame rate are preferably converted to an uncompressed format before slow-motion reproduction.

The moving-image reproduction unit 3 reproduces the acquired moving images at the second frame rate lower than the first frame rate. The "reproduction" refers to acquiring time-series images at the second frame rate, the acquired time-series images need not be displayed on the display unit. This is because the moving images acquired at the second frame rate are used for extraction of pulse waves by the pulse wave extraction unit 5 described below, rather than for viewing. The moving-image reproduction unit 3 can reproduce moving images, using a circuit for playing back video provided for a typical mobile device. However, the moving-image reproduction unit 3 only has to process the moving images without displaying them on the display unit 40, and the moving images need not be played back on the display unit 40. However, the moving-image reproduction unit 3 may display the moving images on the display unit 40 and process them simultaneously. In other words, the "reproduction" of moving images in the present description includes the case where the moving images are displayed on the display unit 40 and the case where the moving images are not displayed on the display unit 40.

To reduce noise from the data of moving images of the first region 501 and the second region 502, a square-wave correlation filter is preferably used to process the moving images of the first region 501 and the second region 502. In addition, the band of the square-wave correlation filter is preferably switched, depending on the frame rate. Thus the device 100 according to the first embodiment preferably further includes the filter control unit 4 that controls the band of a square-wave correlation filter for extracting the first pulse wave and the second pulse wave from the acquired moving images. The square-wave correlation filter is basically a type of digital filter. A pulse wave has a waveform that conveys a signal on both the plus and minus sides and that greatly rises on the plus side at the center. The square-wave correlation filter extracts such a time-varying shape of pulse waves. For example, in the case of reproduction at 30 FPS, pulse waves depend on individuals and slightly vary, depending on conditions. For this reason, it is preferable to execute reproduction by overlapping three or so square-wave correlation filters in which the whole shapes of 28 samples, 24 samples, and 20 samples are fit, respectively, so that the time-varying changes of a pulse wave can be covered. However, these numbers of samples are an example in which the filters are matched to the interval at 30 FPS, in the case of slow-motion reproduction at 240 FPS, it is preferable to octuple the filters accordingly to switch their ranges because temporal density is higher. In other words, it is preferable to control the frame rate and to switch the temporal relationship between the square-wave correlation filters for reducing noise on the reproduction side simultaneously.

The pulse wave extraction unit 5 extracts a first pulse wave in the first region 501 and a second pulse wave in the second region 502, based on the reproduced moving images. As shown in FIG. 1, when the first region 501 is near the heel of the hand and the second region 502 is near a fingertip, the second region 502 is farther from the heart than the first region 501 by the distance d, and because of this distance d, the detected second pulse wave is delayed with respect to the first pulse wave. Thus, a pulse wave velocity pwv can be calculated from the delay time $\Delta t$ and the distance d.

The pulse wave velocity calculation unit 6 calculates a pulse wave velocity pwv ($=d/\Delta t$) from the predetermined distance d and a time difference $\Delta t$ between peaks of the first pulse wave and the second pulse wave.

The blood pressure information inference unit 7 infers blood pressure information, based on the calculated pulse wave velocity. The blood pressure information preferably includes information on at least one of blood pressure, vascular age, or an arteriosclerosis level. A method for estimating blood pressure from a pulse wave velocity will be described below. A pulse wave velocity can be an index of an arteriosclerosis level, because blood vessels are probably harder as the pulse wave velocity is greater. Vascular age can be calculated by comparing the calculated pulse wave velocity with an average of pulse wave velocities of nonhandicapped persons of each age.

The display unit 40 outputs the inferred blood pressure information. For example, the display unit 40 may display an estimated value of blood pressure.

(Reason that the First Frame Rate is a High-Speed Frame Rate)

The reason that moving images captured at the first frame rate higher than the second frame rate are used to detect pulse waves will now be described. Maximizing the delay between pulse waves detected at the first region 501 and at the second region 502 is favorable to measure a pulse wave velocity accurately. A conventional noncontact blood pressure detector calculates a pulse wave velocity from the delay time and the distance between two points separated approximately 1 [m], such as a face and a hand.

However, in the case where the predetermined part is a hand and where the first region 501 and the second region 502 are a region at the heel of the hand and a region at a fingertip, respectively, the distance between the first region 501 and the second region 502 is approximately 15 [cm], and the delay time between pulse waves is approximately 2 [msec]. At 30 FPS, which is the frame rate for playback in MP4 used for recording in general, the sampling time is 33 [msec], and the resolution is approximately 10 [msec] even with interpolation, it is therefore difficult to determine the delay time between two pulse waves accurately even if moving images captured at 30 FPS are processed.

To shorten the sampling time, the device 100 according to the present embodiment captures moving images at the first frame rate faster than the second frame rate, thereby detecting the delay time between pulse waves accurately. For example, by setting the first frame rate to 240 FPS, the sampling time can be 4.17 [msec], and the resolution can be reduced to approximately 1 [msec] with interpolation and matched to approximately 2 [msec], which is the delay time between pulse waves.

(Reason that the Second Frame Rate is Lower than the First Frame Rate)

When the device for inferring blood pressure information according to the present embodiment is implemented using a mobile device, such as a smartphone, which has limited capability of image processing, it is difficult to analyze pulse waves of two points at the first frame rate simultaneously, even if images can be captured at the first frame rate.

For this reason, instead of real-time analysis, it is preferable to set the frame rate at the time of capturing moving images to a first frame rate, and the frame rate at the time of reproducing pulse waves to a second frame rate (e.g., 30 FPS) lower than the first frame rate. To achieve this, the device 100 according to the present embodiment converts the format of moving images, for example, from MP4 format to Base64 format (footage conversion) and stores them, and reproduces the moving images, which are captured at the first frame rate, in slow motion at the second frame rate.

It is said that the frame rate for playback of video that does not look unnatural is 30 FPS from the viewpoint of the characteristics of human eyesight, typical mobile devices have the function of playing back video at 30 FPS. When the second frame rate is 30 FPS, moving images captured at 240 FPS, which is the first frame rate, are reproduced at 30 FPS to achieve ⅛-times slow-motion reproduction. This slow-motion reproduction enables precise detection of minute variations in pulse waves and accurate detection of the delay time between pulse waves in the first region 501 and the second region 502.

The example in which the second and first frame rates are 30 and 240 FPS, respectively, has been described herein, but the invention is not limited to such an example. More specifically, the first and second frame rates may be set to values except those illustrated herein, as long as the delay time between two pulse waves can be detected accurately.

Figure 3:
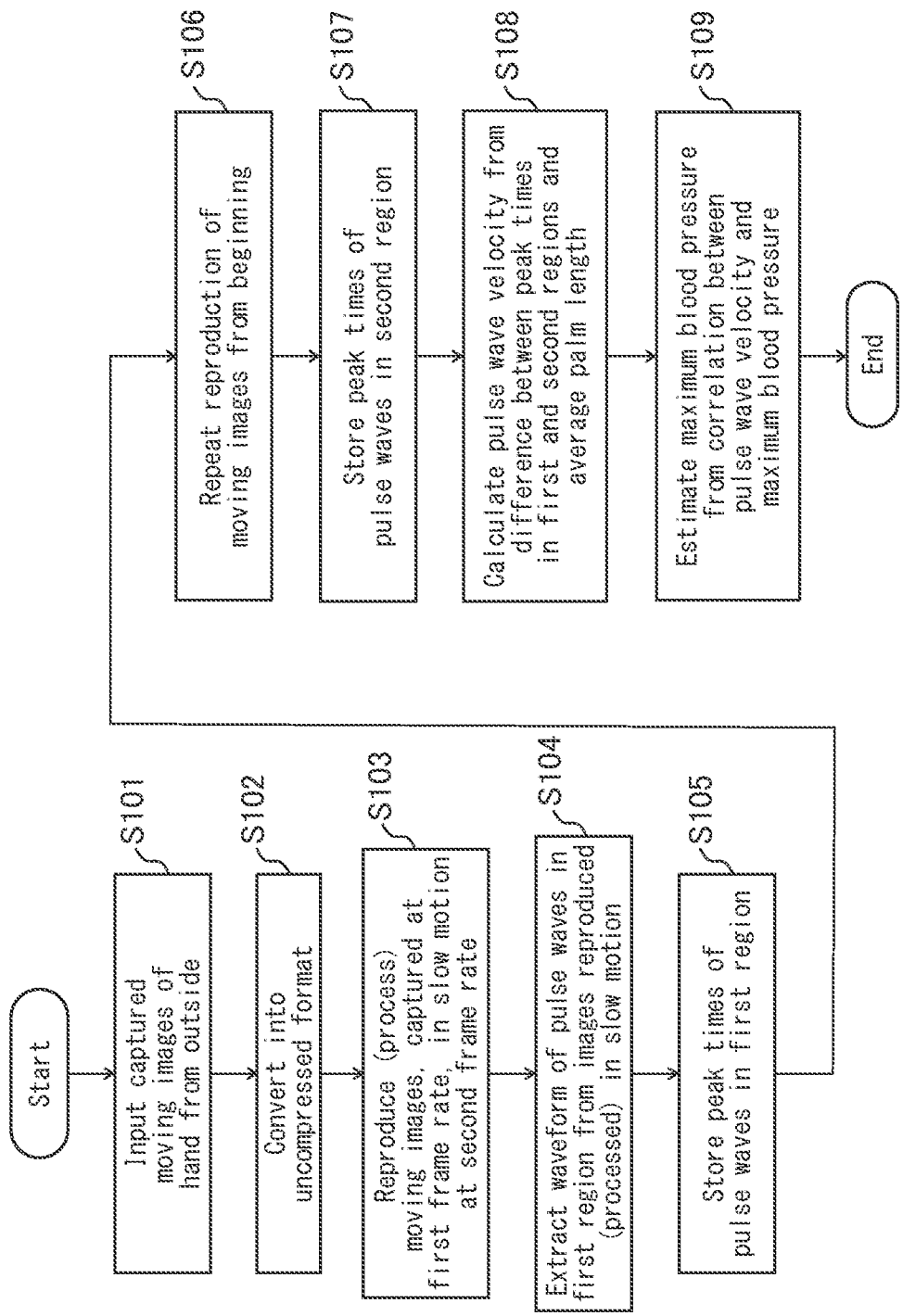
FIG. 3 is a flowchart describing the steps of operation of the device for inferring blood pressure information according to the first embodiment of the present disclosure.

The following describes a method for inferring blood pressure information according to an embodiment of the present disclosure. FIG. 3 shows a flowchart describing the steps of operation of the device 100 according to the first embodiment of the present disclosure.

First, in step S101, the communication unit 20 receives moving-image data from the outside of the device 100, thereby inputting captured moving images of a hand, which is a predetermined part, from outside. In other words, the moving-image acquisition unit 1 acquires moving images of a predetermined part of a living body captured at a first frame rate to detect a delay time between pulse waves in the first region 501 and the second region 502 separated by a predetermined distance d in the predetermined part. The moving-image acquisition unit 1 acquires the file of the inputted moving images and stores it in the moving-image storage section 31.

The case where the moving images acquired by the moving-image acquisition unit 1 are in MP4 format will be described herein as an example, but the moving images may be in another format. The moving images of the predetermined part of the subject are not limited to ones captured with a camera incorporated in the mobile device 200, and may be a file of moving images captured with another terminal. In the described example, the predetermined part is a hand.

It is herein assumed that the moving images are captured in advance, for example, at the first frame rate (e.g., 240 FPS) higher than the second frame rate (e.g., 30 FPS). However, the invention is not limited to such an example, and moving images captured at another frame rate, e.g., 960 FPS, may be used.

Next, in step S102, the moving-image conversion unit 2 converts the acquired moving images of the predetermined part in MP4 format to moving images in an uncompressed format. For example, the converted moving images may be in Base64 format as the uncompressed format. However, the moving images in MP4 format may be converted to moving images in another uncompressed format.

The reason that the moving images in MP4 format are converted to moving images in an uncompressed format, e.g., in Base64 format, is as follows. More specifically, since MP4 format is such that moving images may be played back at low quality, depending on the operating environment of the terminal, the intervals of played images may not be constant in general during playback of MP4 streaming video, depending on the operating environment, thus a time shift tends to occur in pulse waves when captured moving images are played back. The device 100 according to the present embodiment, which needs to detect pulse waves precisely from moving images, may not be able to detect times of peaks of pulse waves accurately if moving images in MP4 format are reproduced without being converted. Thus, for example, moving images in MP4 format are converted to Base64 format in the form of ASCII code data blocks, which is an uncompressed video format, and stored, and then reproduced at regular intervals. Base64 format, in which video is converted to text data of ASCII code, enables reproduction without a time shift for each block of ASCII code. Using such accurate intervals of blocks in reproduction, stored moving images are reproduced twice to detect a time difference between pulse waves at two points. Even if the frame rates are switched in this way to record moving images, the subject is restrained only for approximately 5 to 6 seconds to take pictures, and thus the burden on the subject is probably light.

Next, in step S103, the moving-image reproduction unit 3 reproduces the moving images, which are captured at the first frame rate, in slow motion at the second frame rate. In other words, the moving-image reproduction unit 3 reproduces the acquired moving images at the second frame rate lower than the first frame rate. More specifically, the moving-image reproduction unit 3 reproduces the moving images recorded at 240 FPS, which is the first frame rate, at the second frame rate (e.g., 30 FPS) in low-speed mode. Thus, in this case, the reproduction speed is 30/240=1/8 times, and the images are reproduced as super slow-motion video.

Figure 4:
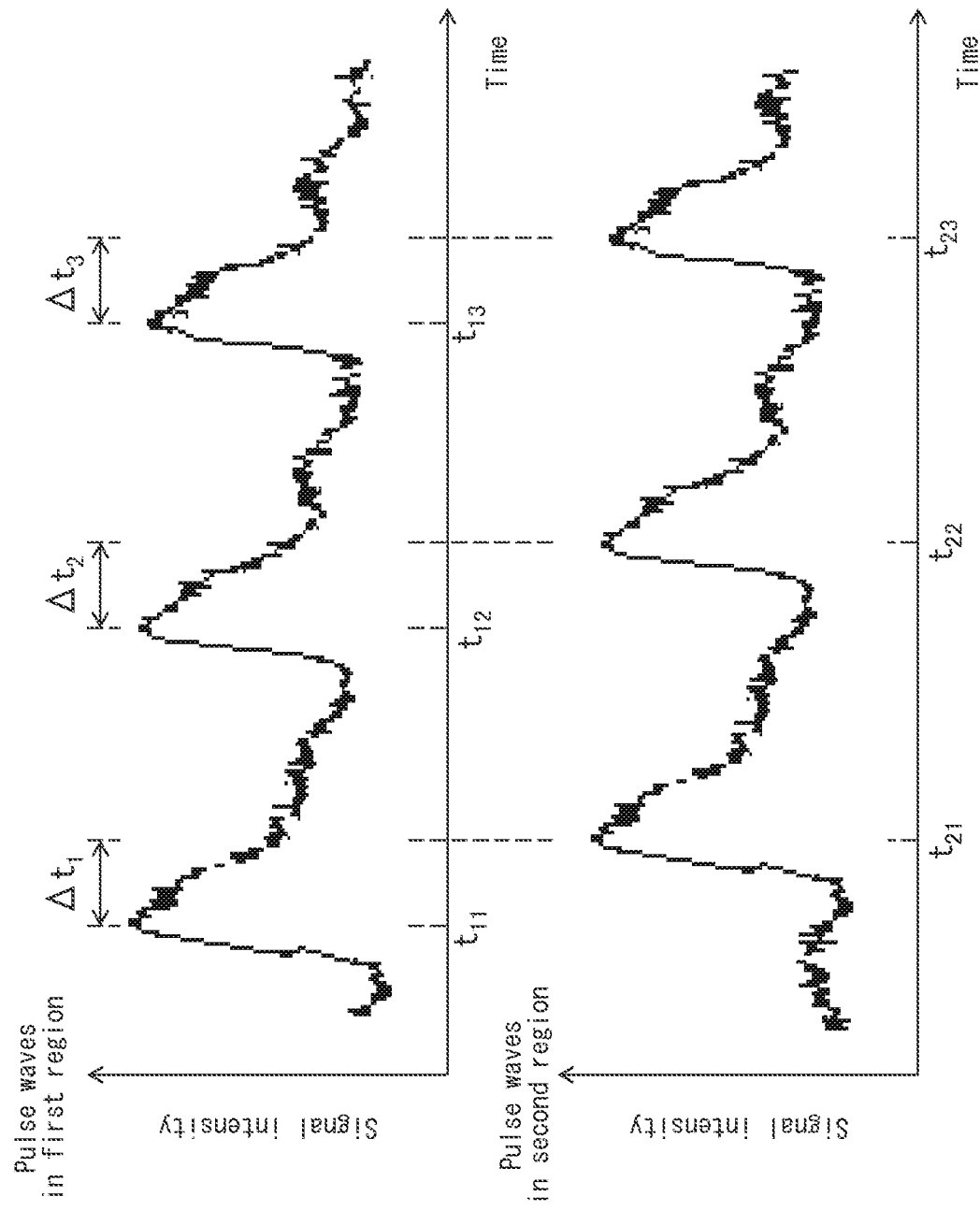
FIG. 4 is a graph showing an example of pulse waves acquired by the device for inferring blood pressure information according to the first embodiment of the present disclosure.

Next, in step S104, the pulse wave extraction unit 5 extracts the waveform of pulse waves in a region at the heel of the hand, which is the first region 501, from the images reproduced in ⅛-speed slow motion. In other words, the pulse wave extraction unit 5 extracts a first pulse wave in the first region 501 and a second pulse wave in the second region 502, based on the reproduced moving images. The position coordinates of the region at the heel of the hand, which is the first region 501, in the moving images of the palm are stored in the storage unit 30. Out of RGB components, the changes in luminance of G (green component) are extracted as pulse waves from the moving images of the first region 501. The waveforms of the extracted pulse waves are shown in FIG. 4.

The waveforms of the moving images converted from the first frame rate (240 FPS) to the second frame rate (30 FPS) include eight times as much information as those of ordinary 30-FPS moving images, and the detected waveform has an octuple period. For this reason, the filter control unit 4 controls the band of a square-wave correlation filter so as to match the waveform eight times longer than usual. The pulse wave extraction unit 5 extracts pulse waves from the waveform in which noise is reduced with the square-wave correlation filter. Control on the band of the square-wave correlation filter will be described below.

Next, in step S105, the pulse wave extraction unit 5 detects a peak time of the pulse wave in the first region 501 from the pulse wave in the first region, and stores it in the first pulse wave peak time storage section 33. For example, when the detected waveform has three peaks as illustrated in the graph of pulse waves in the first region on the upper side of FIG. 4, the times of the respective peaks, denoted by $t_{11}$, $t_{12}$, and $t_{13}$, are stored in the first pulse wave peak time storage section 33.

Next, in step S106, the moving-image reproduction unit 3 returns to the position of 0 [sec] and repeats reproduction of the moving images from the beginning. At repeating reproduction, the pulse wave extraction unit 5 switches the measurement frame to the second region 502. The position coordinates of the region at the fingertip of the hand, which is the second region 502, in the moving images of the palm are stored in the storage unit 30.

Next, in step S107, the pulse wave extraction unit 5 detects a peak time of the pulse wave in the second region 502 from the pulse wave in the second region, and stores it in the second pulse wave peak time storage section 34. For example, when the detected waveform has three peaks as illustrated in the graph of pulse waves in the second region on the lower side of FIG. 4, the times of the respective peaks, denoted by $t_{21}$, $t_{22}$, and $t_{23}$, are stored in the second pulse wave peak time storage section 34.

Next, in step S108, the pulse wave velocity calculation unit 6 calculates a pulse wave velocity from an average of the differences between the peak times of pulse waves in the first and second regions and an average palm length. In other words, the pulse wave velocity calculation unit 6 calculates a pulse wave velocity from the predetermined distance d and a time difference between peaks of the first pulse wave and the second pulse wave. More specifically, the pulse wave velocity calculation unit 6 reads the peak times $t_{11}$, $t_{12}$, and $t_{13}$ of pulse waves in the first region 501 from the first pulse wave peak time storage section 33, reads the peak times $t_{21}$, $t_{22}$, and $t_{23}$ of pulse waves in the second region 502 from the second pulse wave peak time storage section 34, calculates the time differences $\Delta t_1 = t_{11} - t_{21}$, $\Delta t_2 = t_{12} - t_{22}$, and $\Delta t_3 = t_{13} - t_{23}$ of the pulse waves, and calculates an average ($\Delta t$) of these three values. However, the calculated average of time differences between pulse waves is not limited to an average of three values, and may be an average of two or four or more values.

As the predetermined distance d between the first region 501 and the second region 502 may be used an average value 15 [cm]. However, the invention is not limited to such an example, and the predetermined distance d may be adjusted on the basis of an average of palm lengths of men or women, depending on the gender of the subject, as will be described below, or the predetermined distance d may be adjusted on the basis of an actual measurement of the palm of the subject. The pulse wave velocity pwv can be calculated by dividing (d/$\Delta t$) the predetermined distance d by the calculated average $\Delta t$ of the differences between the peak times of pulse waves.

Figure 5:
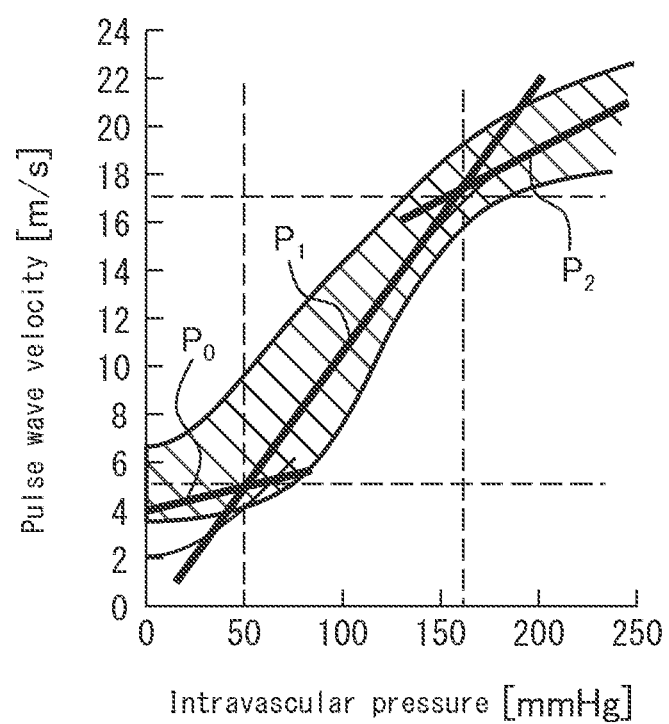
FIG. 5 is a graph showing the relationship between pulse wave velocity and blood pressure.

Next, in step S109, the blood pressure information inference unit 7 estimates maximum blood pressure from the correlation between pulse wave velocity and maximum blood pressure. In other words, the blood pressure information inference unit 7 infers blood pressure information, based on the calculated pulse wave velocity. The storage unit 30 preferably stores information on statistical correlation between pulse wave velocity and maximum blood pressure (systolic pressure value). Minimum blood pressure (diastolic pressure) may be calculated from the pulse wave velocity. FIG. 5 shows the relationship between pulse wave velocity and blood pressure ("Indirect method of blood pressure measurement for the biofeedback control of blood pressure", Japanese Journal of Biofeedback Research, 1982, Volume 9, Pages 28-31). The graph shown in FIG. 5 can be roughly divided into three areas.

The first area is one where the pulse wave velocity pwv is below 5.0 [m/s]. In this area, blood pressure $P_0$ can be calculated by the following Expression (1).

$$P_0 = (50.0 \times pwv) - 150 \tag{1}$$

The second area is one where the pulse wave velocity pwv is from 5.0 to 17.0 [m/s]. In this area, blood pressure $P_1$ can be calculated by the following Expression (2).

$$P_1 = 9.4 \times pwv \tag{2}$$

The third area is one where the pulse wave velocity pwv is above 17.0 [m/s]. In this area, blood pressure $P_2$ can be calculated by the following Expression (3).

$$P_2 = (17.5 \times pwv) - 150 \tag{3}$$

The reason that moving images captured at high speed are reproduced in slow motion to determine a pulse wave velocity between close points as in a palm will now be described. In the case of usual photography at a frame rate of approximately 30 FPS, the sampling time is approximately 33 [msec] and becomes approximately 10 [msec] with interpolation.

According to the graph of the relationship between pulse wave velocity and blood pressure shown in FIG. 5, the pulse wave velocity corresponding to a usual measurement range of blood pressure of 90 to 180 [mmHg] is approximately 6 to 24 [m/s]. In this case, when an average palm length is 15 [cm], the range of identifiable differences between peak times of pulse waves is 6.25 to 25 [msec]. In this case, when a target resolution of blood pressure is 5 [mmHg], a time difference of approximately 2 [msec] has to be detected in pulse waves.

However, at an ordinary frame rate of 30 FPS, the resolution is as little as approximately 10 [msec] even with interpolation. With the function of photography at the first frame rate prepared for a smartphone, an iPhone (registered trademark) is capable of high-speed photography at 240 FPS, which provides a sampling time of 4.17 [msec] and a resolution of approximately 1 [msec] with interpolation.

Similarly, a midrange or high-end model of android (registered trademark) is capable of high-speed photography at 960 FPS, which provides a sampling time of 1.04 [msec] and a resolution of approximately 0.3 [msec] with interpolation.

A particular model is capable of high-speed photography at 7680 FPS, which provides a sampling time of 0.13 [msec] and a resolution of approximately 0.04 [msec] with interpolation.

As described above, it is difficult to accurately detect a delay time between pulse waves in two regions separated by approximately 15 [cm], as in a palm, in the moving images captured at a frame rate of approximately 30 FPS. However, even in a small part, such as a palm, the use of moving images captured at the first frame rate enables accurate detection of a delay time between pulse waves in two regions and accurate calculation of a pulse wave velocity.

The following describes a switch of the square-wave correlation filters between moving images at 240 FPS, which is the first frame rate, and moving images at 30 FPS, which is the second frame rate. To measure a normal pulse rate of 50 to 100 [bpm], square-wave correlation filters having window widths of 20, 24, and 28 samples are preferably overlapped for 30-FPS moving images, thereby configuring a band-pass-type filter. The square-wave correlation filter, which is a band-pass filter, cuts off a direct-current component, resulting in pulse waves fluctuating on the plus and minus sides with respect to zero.

In contrast, when moving images captured at 240 FPS, which is the first frame rate, are played at the second frame rate of 30 FPS, the window widths of the square-wave correlation filters are octupled because the period is octupled. More specifically, the above window widths (20, 24, and 28) in the case of 30 FPS are switched to (160, 192, and 224), respectively. Square-wave correlation filters appropriate for moving images reproduced in slow motion can be used by switching window widths according to the change in frame rate in this way, which enables appropriate noise reduction.

As described above, the device for inferring blood pressure information according to the first embodiment can infer blood pressure information conveniently, using moving images of a predetermined part of a subject inputted from outside.

Second Embodiment

Regarding the device 100 according to the first embodiment described above, an example has been described in which blood pressure information is inferred using a moving-image file inputted from outside. Unlike this, a device for inferring blood pressure information according to a second embodiment is characterized in that the device itself captures images of a predetermined part of a subject.

Figure 6:
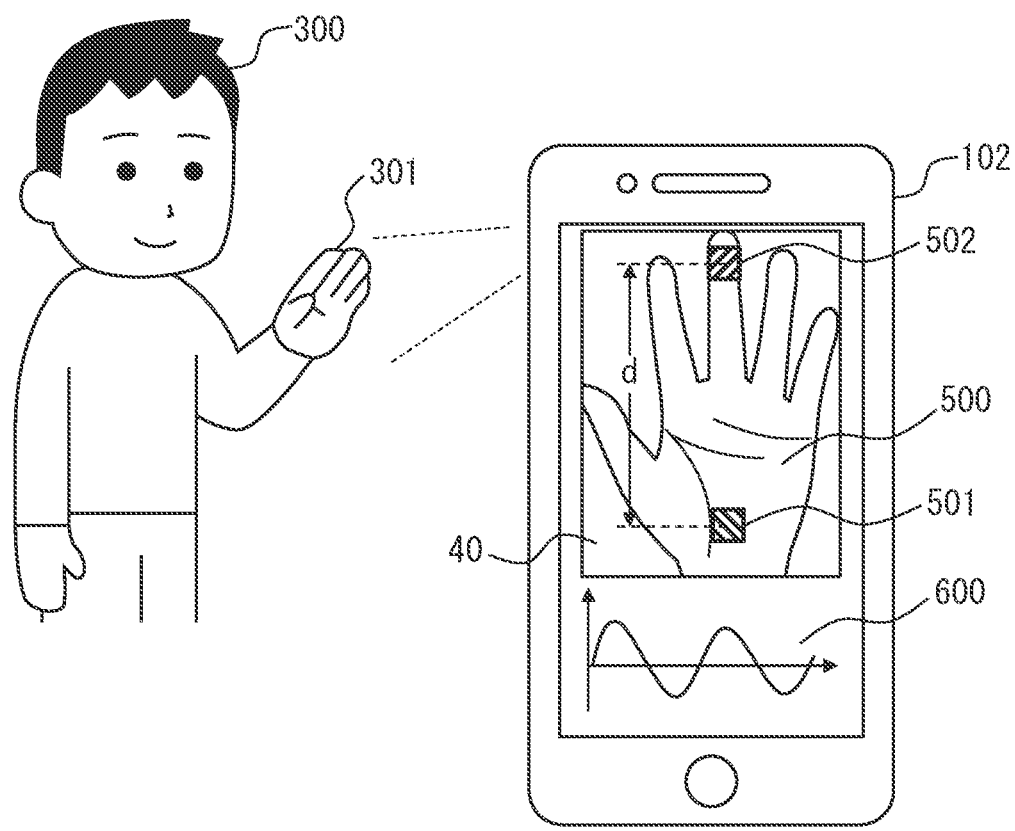
FIG. 6 is a schematic diagram describing measurement with a device for inferring blood pressure information according to a second embodiment of the present disclosure.

FIG. 6 shows a schematic diagram describing measurement with a device for inferring blood pressure information according to a second embodiment of the present disclosure. A device 102 for inferring blood pressure information according to a second embodiment captures moving images of a hand 301 of a subject 300, and infers blood pressure information, using the captured moving images 500.

Figure 7:
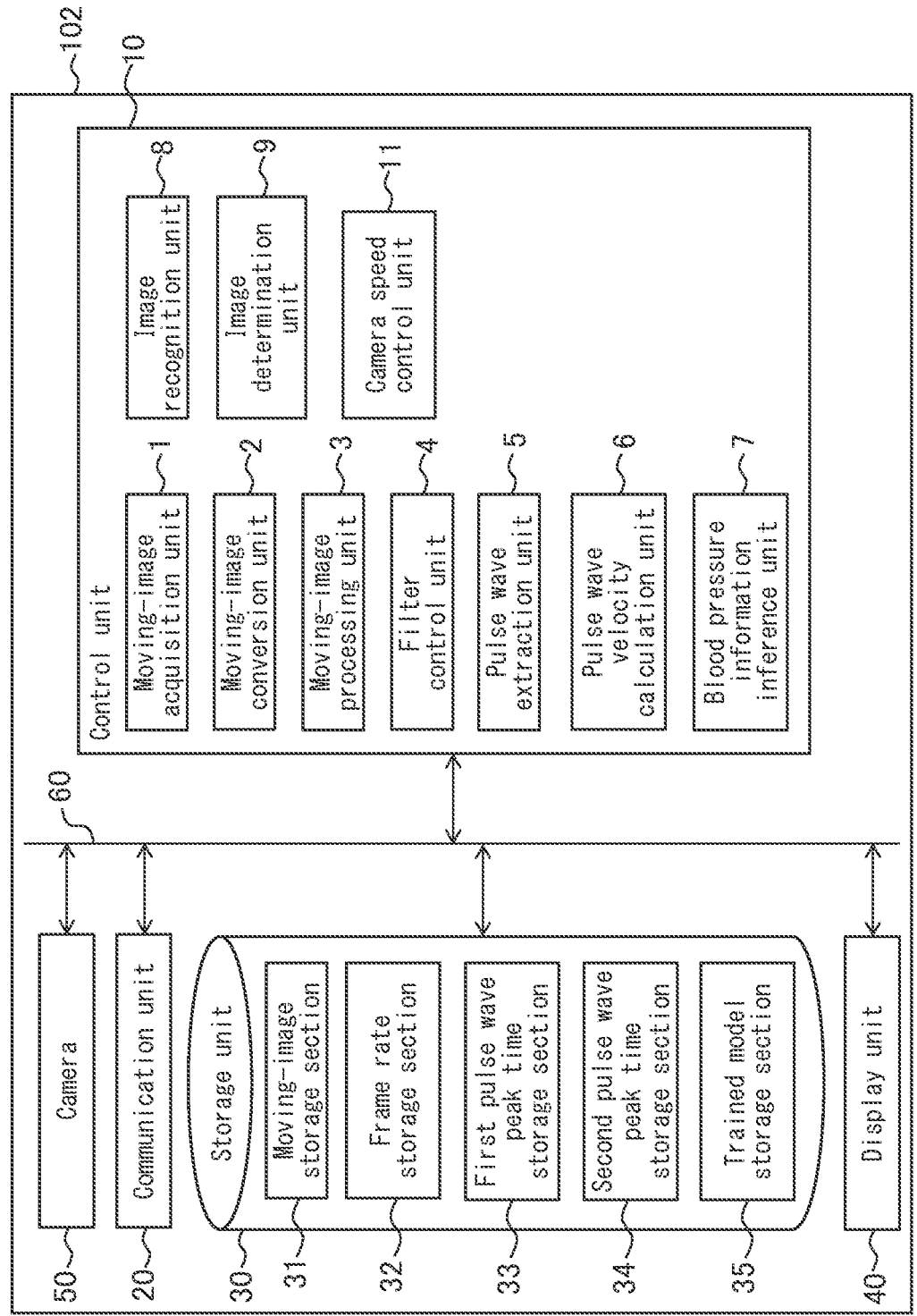
FIG. 7 is a block diagram showing the configuration of the device for inferring blood pressure information according to the second embodiment of the present disclosure.

FIG. 7 is a block diagram showing the configuration of the device 102 according to the second embodiment of the present disclosure. The device 102 according to the second embodiment includes an image recognition unit 8, an image determination unit 9, a camera speed control unit 11, a trained model storage section 35, and a camera 50, in addition to the device 100 according to the first embodiment shown in FIG. 2.

Figure 8:
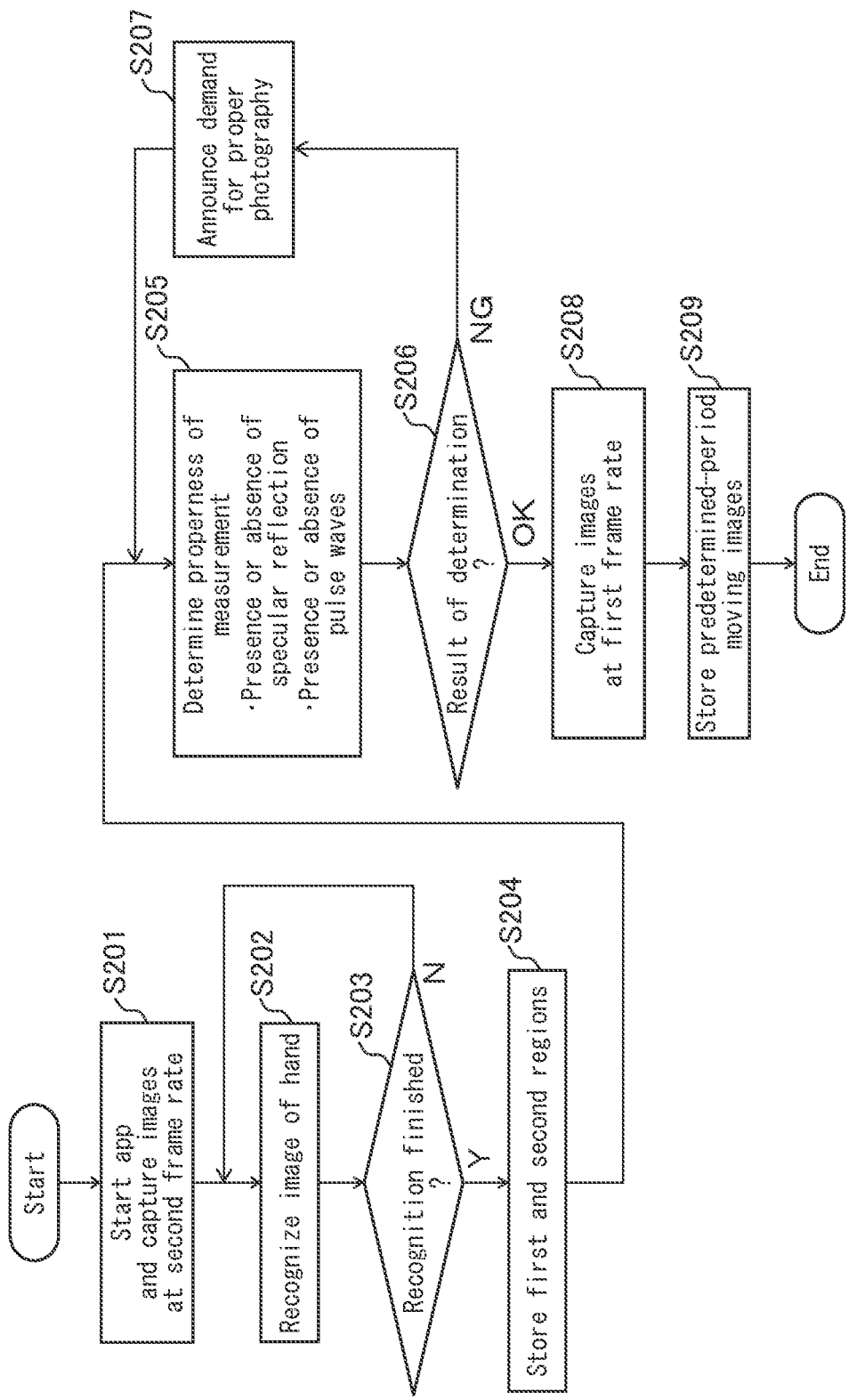
FIG. 8 is a flowchart describing the steps of operation of the device for inferring blood pressure information according to the second embodiment of the present disclosure.

FIG. 8 shows a flowchart describing the steps of operation of the device 102 according to the second embodiment of the present disclosure. First, in step S201, an application program (app) is started, and the camera 50 captures moving images of the hand 301 of the subject 300 at the second frame rate. To recognize an image of the hand, the camera 50 first captures images at the second frame rate (30 FPS). Recording of moving images for the case of image recognition of the hand is preferably executed slowly at the second frame rate. This is because high-speed recording at the first frame rate makes it difficult for the device 102, which is a mobile device, to execute real-time processing in terms of throughput of the CPU although image recognition of the hand is preferably executed in real time.

Next, in step S202, an image of the hand is recognized. When the hand 301 is held in front of the camera 50, the image recognition unit 8 recognizes an image of the hand, which is the predetermined part, out of the acquired moving images, using a trained image recognition model stored in the trained model storage section 35. In other words, in the present embodiment, the image recognition unit 8 recognizes an image of the predetermined part out of moving images at the second frame rate acquired by the moving-image acquisition unit 1, before the moving-image acquisition unit acquires the moving images captured at the first frame rate (step S208) as will be described below.

Next, in step S203, whether recognition of the hand 301 is completed is determined. When recognition of the hand is not completed, the process returns to step S202 and image recognition of the hand image is executed again. When recognition of the hand 301 is completed, measurement of pulse waves is started.

Next, in step S204, a feature point at the bottom of the palm, which is a first region 501, on the wrist side and a feature point at the top of a fingertip, which is a second region 502, are determined as measurement frames, based on the result of recognition of the hand, and their position coordinates in the image are stored in the storage unit 30.

Next, in step S205, the image determination unit 9 determines whether images of the hand can be captured appropriately. In other words, the image determination unit 9 determines whether pulse waves can be detected from moving images at the second frame rate acquired by the moving-image acquisition unit 1, before the moving-image acquisition unit 1 acquires the moving images captured at the first frame rate. The items of determination include, for example, the presence or absence of specular reflection and pulse waves. More specifically, video of the skin in the two measurement frames of the first region 501 and the second region 502 are acquired at the second frame rate (30 FPS) without being processed, and the image determination unit 9 simply checks the presence or absence of specular reflection and pulse waves.

When the total value of RGB in the measurement frames is not less than a predetermined value, it is determined that specular reflection has occurred. When specular reflection has occurred, the result of determination is "NG", because it is difficult to detect the change in color of the skin surface.

As for the presence or absence of pulse waves, whether periodic changes in luminance of the green component G out of RGB color signals can be detected is determined. When they cannot be detected, the result of determination is "NG", because pulse waves cannot be detected.

Since moving images captured at 30 FPS are used, pulse waves are extracted with the filter control unit 4 controlling the band of square-wave correlation filters according to the sampling time of 33.3 [msec].

In step S206, whether the result of determination is "NG" or "OK" is determined. If "NG," proper photography is demanded by an announcement (warning), e.g., "Change the position relative to lighting to take pictures," in step S207.

If the result of determination by the image determination unit 9 is "OK," the camera speed control unit 11 reads the set value of the first frame rate stored in the frame rate storage section 32, and moving images of the palm are captured at 240 FPS, which is the first frame rate, in step S208.

Next, in step S209, predetermined-period moving images of the palm are stored. More specifically, pictures are taken with the camera 50 in MP4 format at the first frame rate for approximately 5 [sec], and moving images are recorded in the moving-image storage section 31.

A pulse wave velocity is calculated using the moving images of the palm captured as described above, and blood pressure information is inferred from the calculated pulse wave velocity. Since the steps of inferring blood pressure information using the moving images captured with the camera 50 are similar to those in the case of the device 100 according to the first embodiment, detailed description thereof is omitted.

Third Embodiment

Regarding the devices for inferring blood pressure information according to the above embodiments, an example has been shown in which the predetermined distance d between the center positions of the first region 501 and the second region 502 is an average value of Japanese men (e.g., 15 [cm]). However, the predetermined distance d varies depending on the height of the subject. Thus, when the part whose pulse-wave moving images are captured for measuring blood pressure is a hand, it is necessary to determine the accurate predetermined distance of the path of propagation of pulse waves, together with the accurate propagation time t, to increase the absolute accuracy of the pulse wave velocity pwv in the hand.

Although it is difficult to measure the size of a hand simply with a mobile device, a subject knows his/her height value in general, from which the predetermined distance can be estimated. For example, correlation between height and the length of a hand (hand length) is known from statistical data of AIST (e.g., Makiko Kouchi, 2012: AIST Measurement data of Japanese hands, https://www.airc.aist.gojp/dhrt/hand/index.html). The "hand length" herein refers to the straight-line distance from the creases of the wrist to the end of the middle finger for the case where the hand (thumb, fingers, and palm) is spread.

A device for inferring blood pressure information according to a third embodiment is characterized in that a height value and gender of a subject are inputted, the hand length is estimated from the height value, and blood pressure is calculated with a predetermined distance estimated from the hand length.

Figure 9:
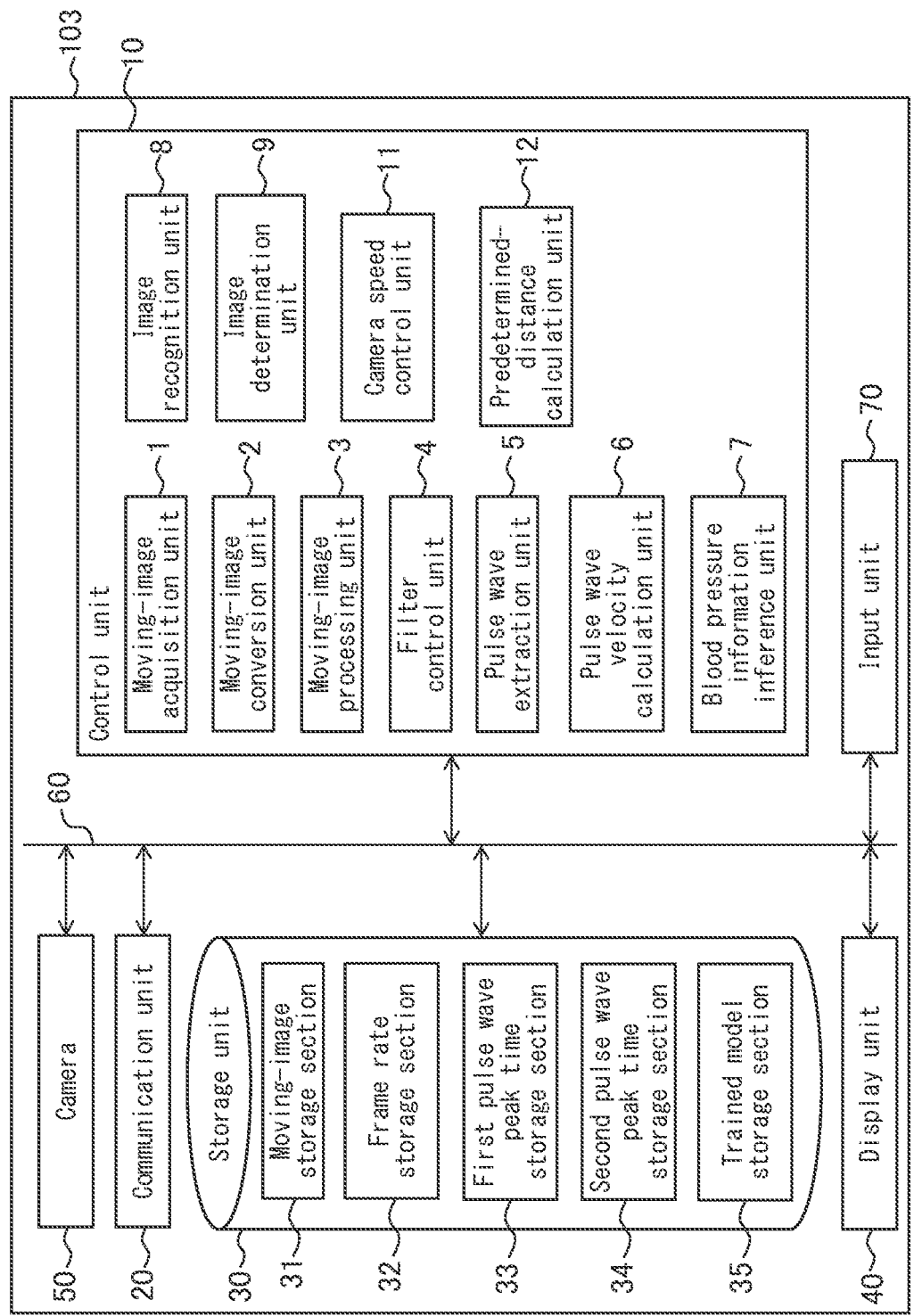
FIG. 9 is a block diagram showing the configuration of a device for inferring blood pressure information according to a third embodiment of the present disclosure.

FIG. 9 is a block diagram showing the configuration of a device 103 for inferring blood pressure information according to the third embodiment of the present disclosure. The device 103 according to the third embodiment differs from the device 102 according to the second embodiment in that the device 103 further includes an input unit 70 into which information on gender and a height value of a subject who measures blood pressure are inputted, and a predetermined-distance calculation unit 12 that calculates the predetermined distance, based on a hand length estimated from the information on gender and the height value. Since the other components of the device 103 according to the third embodiment are the same as those of the device 102 according to the second embodiment, detailed description thereof is omitted.

The input unit 70 may include icons displayed on the display unit 40 for inputting gender (male or female) and a height value. To input gender, for example, the letters "male" or "female" may be directly inputted into the icon displayed on the display unit 40. Alternatively, a user may touch one of icons displayed on the display unit 40 for selecting male or female to select one or the other.

To input a height value, for example, the height value may be directly inputted into the icon displayed on the display unit 40. Alternatively, a user may touch an icon displayed on the display unit 40 to scroll the height value, thereby selecting the height value.

Alternatively, the input unit 70 may identify the gender and the height value of the subject by voice recognition to input them.

When moving images of the hand of the subject are inputted from outside and used, the filename of the moving images may include information for identifying gender and information on the height value. For example, when the subject is a male, a letter "M" indicating a male may be included in the filename of the moving images to identify the subject as a male. When the height of the subject is 170 cm, the filename of the moving images may include characters "170." However, characters included in a moving-image file are not limited to these examples, and other characters may be included in the filename to input information on gender and height.

The gender and the height value of the subject need to be inputted into the input unit 70 before the blood pressure information inference unit 7 calculates blood pressure of the subject. For example, the gender and the height value of the subject may be inputted into the input unit 70 before moving images of the hand of the subject are captured. Thus, for example, a command for inputting the gender and the height value of the subject into the input unit 70 may be displayed on the display unit 40 or outputted as voice guidance before moving images of the hand of the subject are captured with the camera 50.

(Relationship Between Height and Hand Length)

Table 1 below shows an example of the relationship between the height and the hand length of Japanese men, Table 2 shows an example of the relationship between the height and hand length of Japanese women.

TABLE 1

An example of the relationship between the height and the hand length of Japanese men

|  | height [mm] | hand length [mm] |
| --- | --- | --- |
| minimum | 1560 | 163.5 |
| average | 1716 | 183.4 |
| maximum | 1890 | 203.7 |

TABLE 2

An example of the relationship between the height and the hand length of Japanese women

|  | height [mm] | hand length [mm] |
| --- | --- | --- |
| minimum | 1480 | 150.6 |
| average | 1589 | 169.3 |
| maximum | 1720 | 191.6 |

Figure 10A:
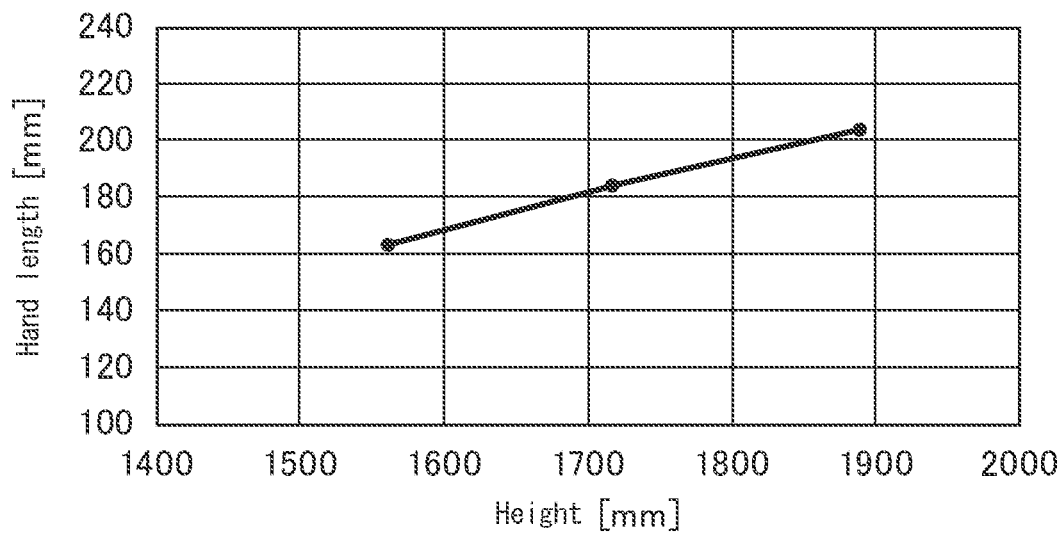
FIG. 10A is a graph showing the relationship between the height and the hand length of Japanese men.
Figure 10B:
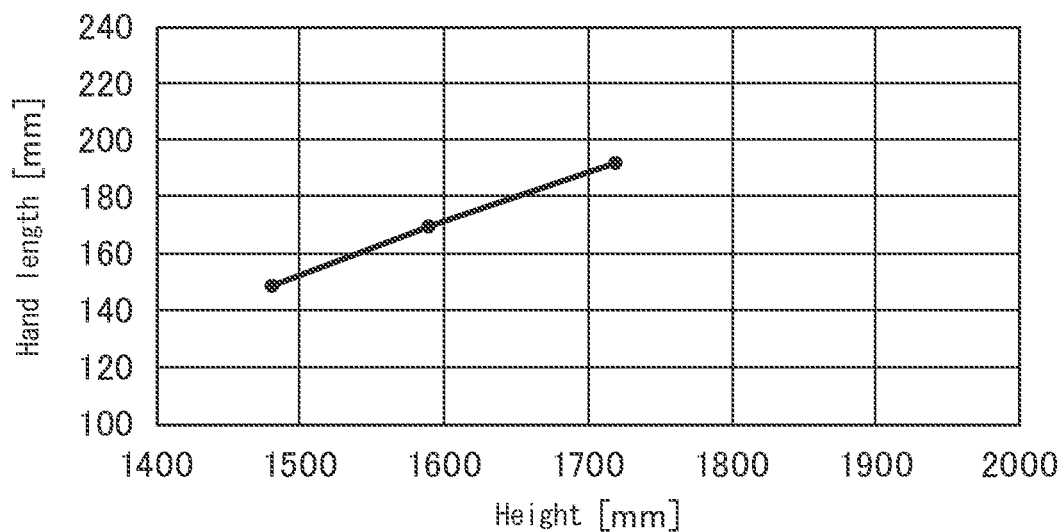
FIG. 10B is a graph showing the relationship between the height and the hand length of Japanese women.

FIG. 10A is a graph showing the relationship between the height and the hand length of Japanese men. FIG. 10B is a graph showing the relationship between the height and the hand length of Japanese women. FIGS. 10A and 10B are plots of data shown in Tables 1 and 2, respectively. As can be seen from FIGS. 10A and 10B, the hand length and the height value have a linear relation from the minimum to the maximum of height. For example, the straight line shown in FIG. 10A can be approximated by the least-squares method with the following Expression (4):

$$y = 0.1217x - 26.068 \quad (4)$$

where the hand length and height are denoted by y [mm] and x [mm], respectively.

Thus the hand length can be calculated from any height value between the minimum and the maximum with Expression (4). However, the expression to calculate the hand length from a height value is not limited to Expression (4) above.

Expression (4) above can be stored in the storage unit 30. The predetermined-distance estimation unit 12 can acquire a height value from the input unit 70, and calculate the hand length, using Expression (4) read from the storage unit 30.

However, the method for the predetermined distance estimation unit 12 to estimate the hand length from a height value is not limited to the case where a mathematical expression, such as Expression (4), is used. For example, a database in which height values and hand lengths are associated with each other may be stored in the storage unit 30, and the predetermined distance estimation unit 12 may select the value of hand length corresponding to a height value acquired from the input unit 70.

(Calculation of the Path of Propagation of Pulse Waves Based on a Hand Length)

As described above, the hand length can be determined from a height value. However, the predetermined distance used for calculating a pulse wave velocity in the present example is not the same as the hand length. This is because, although a predetermined area is necessary for extracting images of the skin varying depending on the blood flow, the crease portion is not flat, whereas the fingertip does not have an area large enough to detect pulse waves, and thus the positions of the first region 501 and the second region 502 are closer to the center than the creases and the fingertip.

Figure 11:
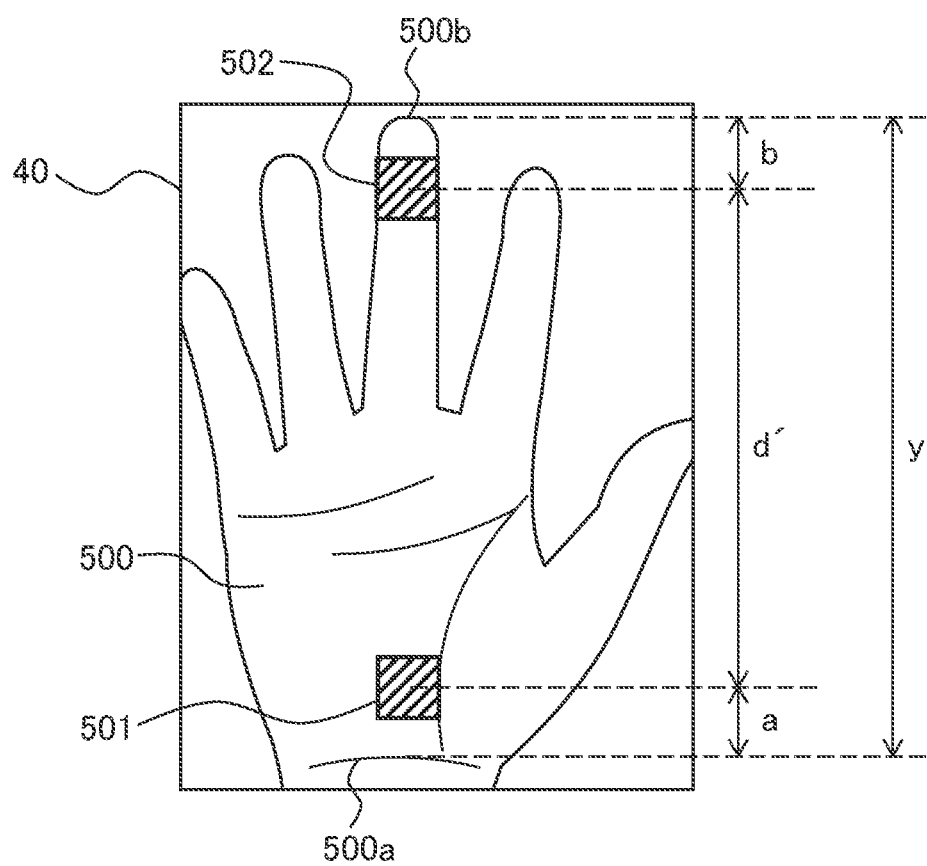
FIG. 11 shows the relationship between the hand length of a subject and the predetermined distance.

FIG. 11 shows the relationship between the hand length y of a subject and the predetermined distance d'. As shown in FIG. 11, the center position of the first region 501 is closer to the fingertips than a crease 500a by a first correction value a. The center position of the second region 502 is closer to the heel of the hand than a fingertip 500b by a second correction value b. Thus the predetermined distance d' and the hand length y have the relationship of the following Expression (5).

$$d' = y - a - b \quad (5)$$

With Expressions (4) and (5) above, the predetermined distance d' can be calculated from a height value inputted into the input unit 70. As an example, the following describes the case in which the subject is a male and the height is 1700 [mm]. For example, assume that the first correction value a is 20 [mm] and the second correction value b is 10 [mm]. Then, the hand length y can be calculated by Expression (4) as follows.

$$y = (0.1217 \times 1700) - 26.068 = 180.822 \text{ [mm]}$$

The predetermined distance d' can be calculated by Expression (5) as follows.

$$d' = 180.822 - 20 - 10 = 150.822 \text{ [mm]}$$

As described above, the device 103 according to the third embodiment can calculate the predetermined distance accurately, based on the gender and the height value of the subject, and thus calculate blood pressure information more accurately.

The above description has been given by taking inference of human blood pressure information as an example, but the devices for inferring blood pressure information according to the embodiments can be used not only for humans but also for other living things, as long as they circulate blood from the heart through the body.

The devices for inferring blood pressure information according to the embodiments can check blood pressure conveniently for the purpose of screening to manage the physical condition of an elderly person residing in a nursing home or a heavy physical laborer working, for example, at a construction site.

A conventional cuff-type sphygmomanometer requires rolling up a sleeve to wind a cuff around an upper arm or a wrist on each occasion of measurement, which bothers a subject. However, the devices for inferring blood pressure information according to the embodiments only require making a predetermined part, such as a hand, face a camera of a mobile device and do not require winding a cuff, enabling measuring blood pressure conveniently in a non-contact manner.

In addition, although a conventional sphygmomanometer requires a subject to wear the device directly for measurement, the devices for inferring blood pressure information according to the embodiments can measure blood pressure on the receiver side only with transmitted video file made by capturing images of a palm for 5 to 10 seconds, which enables a health check of a subject who does not have a sphygmomanometer or who is in a disaster area or a remote area.

For elderly people who tend to have high blood pressure, an exercise for training the brain may increase the risk of a stroke because of an increase in blood pressure caused by tension. The devices for inferring blood pressure information according to the embodiments can check blood pressure simply while the brain is being trained, thus the brain can be trained appropriately while blood pressure is managed.

The effect of improving balance between autonomic nerves provided, for example, by mindfulness can be easily realized as a change in blood pressure, but measuring blood pressure with a cuff after the achievement of mindfulness may change the precious improvement state to the initial state. Since the devices for inferring blood pressure information according to the embodiments can measure blood pressure without bothering a subject, the effect of mindfulness can be evaluated correctly in terms of a change in blood pressure.

The invention claimed is:

1. A device for inferring blood pressure information, comprising:
   a moving-image acquisition unit configured to acquire moving images of a first region and a second region separated by a predetermined distance in a predetermined part of a living body captured at a first frame rate
   a pulse wave extraction unit configured to extract a first pulse wave in the first region and a second pulse wave in the second region, based on moving images acquired at a second frame rate lower than the first frame rate;
   a pulse wave velocity calculation unit configured to calculate a pulse wave velocity based on the first pulse wave and the second pulse wave;
   a blood pressure information inference unit configured to infer blood pressure information, based on the calculated pulse wave velocity; and
   an output unit configured to output the inferred blood pressure information.

2. The device according to claim 1, further comprising a moving-image conversion unit configured to convert the moving images captured at the first frame rate to the moving images converted to the second frame rate in an uncompressed format.

3. The device according to claim 1, further comprising a filter control unit configured to control the band of a square-wave correlation filter for extracting the first pulse wave and the second pulse wave from the acquired moving images.

4. The device according to claim 1, further comprising an image recognition unit configured to recognize an image of the predetermined part out of moving images at the second frame rate acquired by the moving-image acquisition unit, before the moving-image acquisition unit acquires the moving images captured at the first frame rate.

5. The device according to claim 4, wherein the image recognition unit recognizes an image of the predetermined part out of the acquired moving images, using a trained image recognition model.

6. The device according to claim 1, further comprising an image determination unit configured to determine whether pulse waves can be detected from moving images at the second frame rate acquired by the moving-image acquisition unit, before the moving-image acquisition unit acquires the moving images captured at the first frame rate.

7. The device according to claim 6, wherein the image determination unit warns when pulse waves cannot be detected from the acquired moving images.

8. The device according to claim 1, wherein the blood pressure information includes information on at least one of blood pressure, vascular age, or an arteriosclerosis level.

9. The device according to claim 1, wherein the predetermined part is a hand.

10. The device according to claim 9, further comprising:
    an input unit into which information on gender and a height value of a subject whose blood pressure is measured are inputted; and
    a predetermined-distance calculation unit configured to calculate the predetermined distance, based on a hand length estimated from the information on gender and the height value.

11. A method for inferring blood pressure information, comprising:
- acquiring moving images of a first region and a second region separated by a predetermined distance in a predetermined part of a living body captured at a first frame rate by a moving-image acquisition unit;
- extracting a first pulse wave in the first region and a second pulse wave in the second region, based on moving images acquired at a second frame rate lower than the first frame rate by a pulse wave extraction unit;
- calculating a pulse wave velocity based on the first pulse wave and the second pulse wave by a pulse wave velocity calculation unit;
- inferring blood pressure information, based on the calculated pulse wave velocity by a blood pressure information inference unit; and
- outputting the inferred blood pressure information by an output unit.

12. A non-transitory computer readable recording medium having stored therein a program for inferring blood pressure information, the program causing a computer to execute a process comprising the steps of:
- acquiring moving images of a first region and a second region separated by a predetermined distance in a predetermined part of a living body captured at a first frame rate
- extracting a first pulse wave in the first region and a second pulse wave in the second region, based on moving images moving images acquired at a second frame rate lower than the first frame rate;
- calculating a pulse wave velocity based on the first pulse wave and the second pulse wave;
- inferring blood pressure information, based on the calculated pulse wave velocity; and
- outputting the inferred blood pressure information.

* * * * *